United States Patent
Ganesan et al.

(10) Patent No.: US 8,615,751 B2
(45) Date of Patent: Dec. 24, 2013

(54) SEEDING PRODUCT INFORMATION

(75) Inventors: Venkatadri Ganesan, Bangalore (IN);
Vijay Nichinbatl Sriram, Bangalore (IN); PhiDien Nguyen, San Jose, CA (US); Shamik Ganguly, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1468 days.

(21) Appl. No.: 11/680,383

(22) Filed: Feb. 28, 2007

(65) Prior Publication Data
US 2008/0209408 A1 Aug. 28, 2008

(51) Int. Cl.
*G06F 9/04* (2006.01)
*G06F 9/445* (2006.01)

(52) U.S. Cl.
USPC ........... 717/169; 717/168; 717/171; 717/172; 717/174

(58) Field of Classification Search
None
See application file for complete search history.

(56) References Cited

U.S. PATENT DOCUMENTS

| | | | | |
|---|---|---|---|---|
| 6,675,382 B1* | 1/2004 | Foster | | 717/177 |
| 7,559,058 B2* | 7/2009 | Blumfield et al. | | 717/172 |
| 7,735,078 B1* | 6/2010 | Vaidya | | 717/171 |
| 2003/0218628 A1* | 11/2003 | Deshpande et al. | | 345/738 |
| 2006/0161914 A1* | 7/2006 | Morrison et al. | | 717/174 |

\* cited by examiner

*Primary Examiner* — Lewis A Bullock, Jr.
*Assistant Examiner* — Mark Gooray
(74) *Attorney, Agent, or Firm* — Kilpatrick Townsend & Stockton LLP

(57) ABSTRACT

Systems, methods, and machine-readable media are disclosed for patching software based on seeded product information. In one embodiment, patching software can comprise receiving a patch deliverable that can include a software patch and information identifying a target software package. The information identifying the target software package can be read and a determination can be made as to whether the information indicates a known software package. In response to determining the information indicates a known software package, the patch can be installed. In response to determining the information does not indicate a known software package options identifying software packages for which the patch may be used can be presented to a user and a selection of one of the packages can be received. The selected software package can be seeded with the information identifying the target software package and the patch can be installed for the selected software product.

18 Claims, 5 Drawing Sheets

SEEDING PRODUCT INFORMATION

BACKGROUND OF THE INVENTION

Embodiments of the present invention relate generally to providing software updates. More specifically, embodiments of the present invention relate to patching software based on seeded product information.

Methods for updating installed software can be classified into two general categories, re-installing and patching. Re-installing describes a process in which an installed software package, such as an application, is replaced. That is, a previously installed software package is removed or deleted from the system in which it is installed and the original version or a new, modified version of the package is installed in its place. Such a process, while effective, is not always desirable to the user or users of the software package since it usually results in the loss of data, configurations, etc.

Patching refers to a process in which a portion of the installed software package or configuration thereof is modified, added, deleted, etc. for example to correct some particular problem or modify the features or behavior of the installed software package. However, current patching systems require some knowledge of the installed software package in order to properly utilize a patch. For example, a central repository or registry may identify those software packages in a particular system. Patches can be located and applied based on this information. However, in some cases, the central repository or registry may not reflect all software packages on a system or may become incorrect or outdated. Hence, there is a need in the art for improved methods and systems for patching software.

BRIEF SUMMARY OF THE INVENTION

Systems, methods, and machine-readable media are disclosed for patching software based on seeded product information. In one embodiment, a method for patching software based on seeded product information can comprise receiving a patch deliverable, e.g., a file. The patch deliverable can include a software patch and information identifying a target software package for which the patch is intended. The information identifying the target software package can be read from the patch deliverable. A determination can be made as to whether the information identifying the target software package indicates a known software package. In response to determining the information identifying the software package for which the patch is intended indicates a known software package, the patch can be installed for the known software product.

According to one embodiment, determining whether the information identifying the target software package indicates a known software package can comprise comparing the information identifying the target software package to seed information identifying each of at least one software package. For example, the seed information identifying each of at least one software package can comprise information previously stored in a predetermined location.

According to one embodiment, in response to determining the information identifying the software package for which the patch is intended does not indicate a known software package, options identifying at least one software package for which the match may be used can be presented to a user and a selection of one of the at least one software packages can be received from the user. The selected software package can be seeded with the information identifying the target software package and the patch can be installed for the selected software product. Seeding the selected software package with the information identifying the target software package can comprise storing the information identifying the target software package in a predetermined location.

For example, the information identifying the target software package can comprise a product name for the target software package. Additionally or alternatively, the information identifying the target software package comprises a version for the target software package. In some cases, the information identifying the target software package can comprise metadata. For example, the information identifying the target software package can comprise an eXtensible Markup Language (XML) file including the metadata.

According to another embodiment, a method of distributing a software patch deliverable can comprise reading information identifying a target software package for which a software patch is intended. A template defining a format for the software patch deliverable can be read. The software patch deliverable can be generated based on the template and can include the software patch and the information identifying the target software package. For example, the information identifying the target software package can comprise a product name for the target software package and/or a version for the target software package. According to one embodiment, the information identifying the target software package can comprise metadata. For example, the information identifying the target software package can comprise an eXtensible Markup Language (XML) file including the metadata. The software patch deliverable can be provided to one or more client systems in which the target software package may be installed.

According to yet another embodiment, a machine-readable medium can have stored thereon a series of instructions which, when executed by a processor, cause the processor to patch software based on seeded product information by receiving a patch deliverable. The patch deliverable can include a software patch and information identifying a target software package for which the patch is intended. The information identifying the target software package can be read from the patch deliverable. A determination can be made as to whether the information identifying the target software package indicates a known software package. In response to determining the information identifying the software package for which the patch is intended indicates a known software package, the patch can be installed for the known software product.

According to one embodiment, determining whether the information identifying the target software package indicates a known software package can comprise comparing the information identifying the target software package to seed information identifying each of at least one software package. For example, the seed information identifying each of at least one software package can comprise information previously stored in a predetermined location.

According to one embodiment, in response to determining the information identifying the software package for which the patch is intended does not indicate a known software package, options identifying at least one software package for which the patch may be used can be presented to a user and a selection of one of the at least one software package scan be received from the user. The selected software package can be seeded with the information identifying the target software package and the patch can be installed for the selected software product. Seeding the selected software package with the information identifying the target software package can comprise storing the information identifying the target software package in a predetermined location.

For example, the information identifying the target software package can comprise a product name for the target software package. Additionally or alternatively, the information identifying the target software package comprises a version for the target software package. In some cases, the information identifying the target software package can comprise metadata. For example, the information identifying the target software package can comprise an eXtensible Markup Language (XML) file including the metadata.

According to still another embodiment, a system can comprise a software vendor system adapted to generate a patch deliverable. The patch deliverable can include a software patch and information identifying a target software package for which the patch is intended. The system can also include a client system adapted to obtain the patch deliverable from the software vendor system. The client system can read the information identifying the target software package from the patch deliverable, determine whether the information identifying the target software package indicates a known software package on the client system, and in response to determining the information identifying the software package for which the patch is intended indicates a known software package, install the patch for the known software product.

More specifically, the client system can be adapted to determine whether the information identifying the target software package indicates a known software package by comparing the information identifying the target software package to seed information identifying each of at least one software package on the client system. The seed information can identify each of at least one software package system and can comprise information previously stored in a predetermined location. In response to determining the information identifying the software package for which the patch is intended does not indicate a known software package, the client system can be adapted to present to a user options identifying at least one software package for which the patch may be used, receive from the user a selection of one of the at least one software packages, seed the selected software package with the information identifying the target software package, and install the patch for the selected software product. The client system can seed the selected software package with the information identifying the target software package by storing the information identifying the target software package in a predetermined location.

According to one embodiment, the information identifying the target software package can comprise a product name for the target software package. Additionally or alternatively, the information identifying the target software package can comprise a version for the target software package. In some cases, the information identifying the target software package can comprise metadata. For example, the information identifying the target software package can comprise an eXtensible Markup Language (XML) file including the metadata. The software vendor system can be adapted to generate the patch deliverable by reading information identifying a target software package for which a software patch is intended, reading a template defining a format for the software patch deliverable, and generating the software patch deliverable based on the template and including the software patch and the information identifying the target software package.

DETAILED DESCRIPTION OF THE INVENTION

Figure 1:
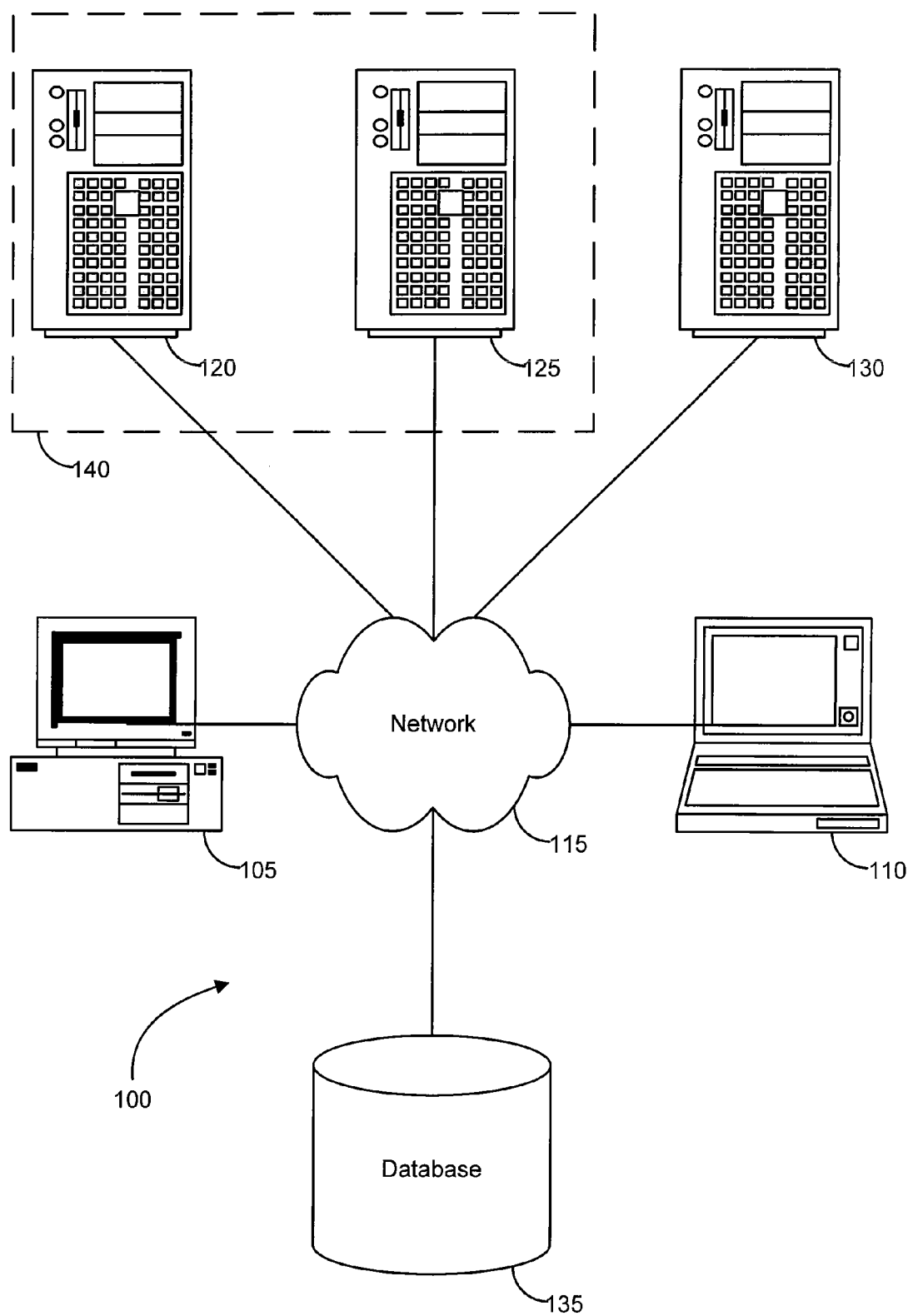
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form. Importantly, it should be noted that while described herein with reference to enterprise solutions, embodiments of the present invention should not be considered limited to use with enterprise solutions. For example, embodiments of the present invention are thought to be equally applicable to other types of application programs and may be especially useful with various large-scale applications.

Embodiments of the present invention provide methods, system and machine-readable media for providing software updates. Generally speaking, embodiments of the present invention provide for patching of software based on seeded product information, for example, in the software packages to be patched. As will be seen, a patch deliverable, e.g., a file, can be received, for example, by a client system that has one or more application or other software packages installed or stored thereon. The patch deliverable can include a software patch and information identifying a target software package for which the patch is intended. The information identifying the target software package can be read from the patch deliverable. A determination can be made as to whether the information identifying the target software package indicates a known, software package. As will be seen, determining whether the information identifying the target software package indicates a known software package can comprise comparing the information identifying the target software package to seed information that may be stored in the software package itself and can identify the software package. For example, the seed information identifying each of at least one software package can comprise information previously stored in a predetermined location in the software package. Upon receiving a patch, this information can be checked and compared to the identifying information in the patch deliverable to determine which software application the patch should be applied to, if any.

In response to determining the information identifying the software package for which the patch is intended indicates a known software package, the patch can be installed for the known software product. In response to determining the information identifying the software package for which the patch is intended does not indicate a known software package, options identifying at least one software package can be presented to a user and a selection of one of the at least one software package can be received from the user. For example, the information identifying a software package for which the patch may be used can, in some cases, identify more than one software package. In such cases, the software packages thus identified can be presented as options to the user for selection or confirmation of the software package for which the patch should be used.

The selected software package can be seeded with the information identifying the target software package and the patch can be installed for the selected software product. Seeding the selected software package with the information identifying the target software package can comprise storing the information identifying the target software package in a predetermined location. That is, once the identifying information from the patch deliverable has been identified by the user as corresponding to a particular software package, that package can be seeded with the identifying information so that subsequent patch deliverables with the same identifying information can be correlated to that particular software package.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Importantly, it should be noted that embodiments of the present invention may be implemented in a wide variety of environments and on a wide variety of devices and/or systems. Therefore, the following exemplary environments and systems are offered for illustrative purposes only and should not be considered limiting on the wide variety of possible implementation of the various embodiments of the present invention.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 105, 110.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
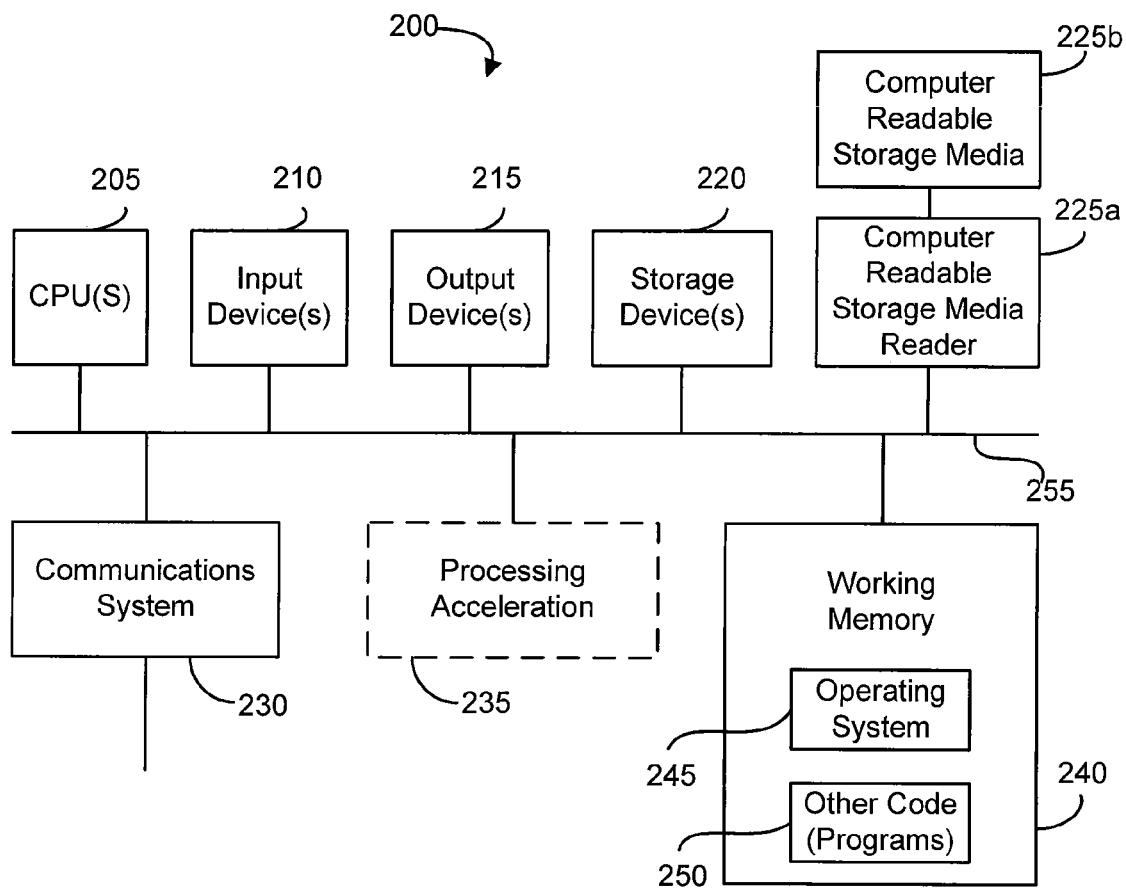
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for performing the various embodiments of the present invention as described herein.

Figure 3:
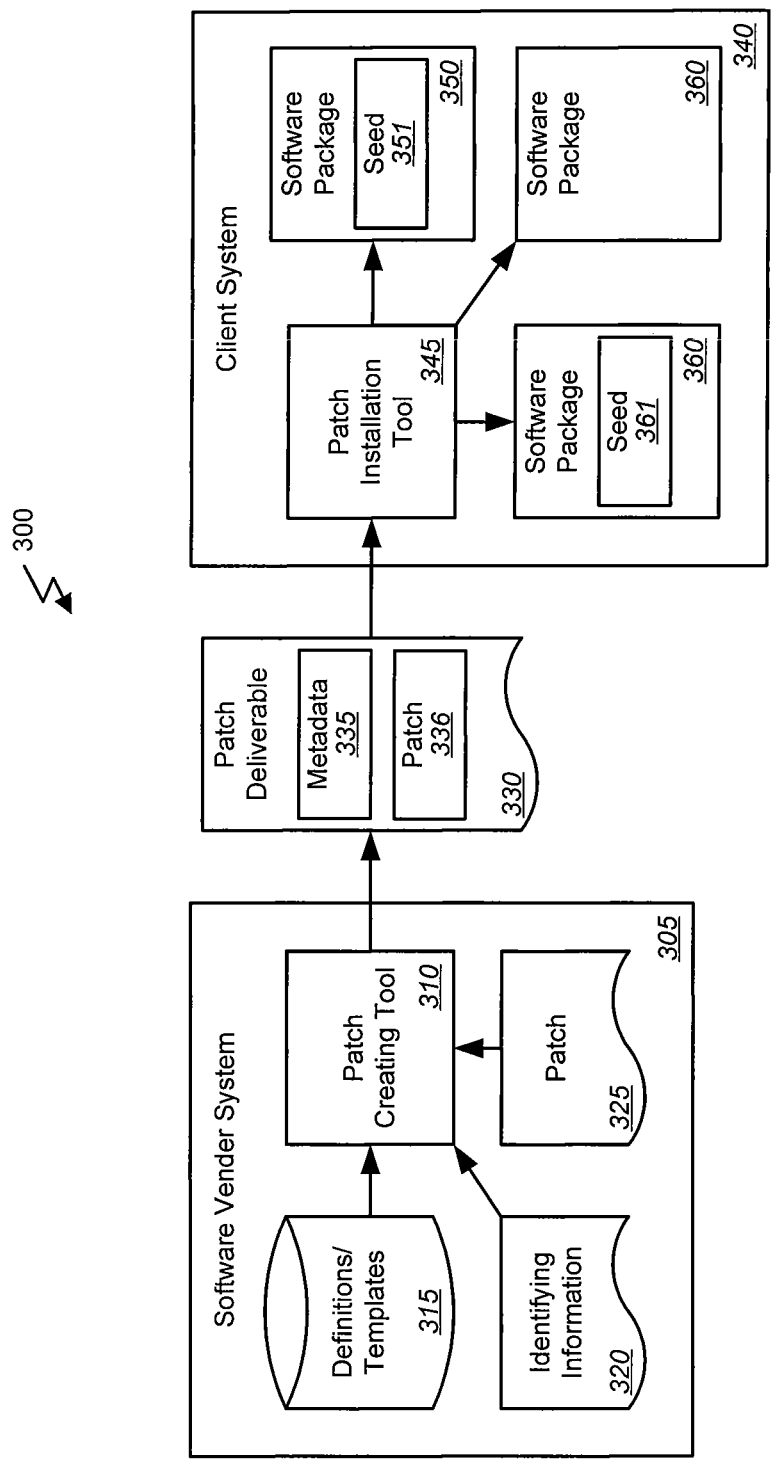
FIG. 3 is a block diagram illustrating functional components of a system for patching software based on seeded product information according to one embodiment of the present invention.

FIG. 3 is a block diagram illustrating functional components of a system for patching software based on seeded product information according to one embodiment of the present invention. In this example, the system 300 includes a software vendor system 305 adapted to generate a patch deliverable 330, e.g., a file, to a client system 340. The software vendor system 305 and client system 340 can be communicatively coupled via a network (not shown here) such as the Internet or other network as described above. In such a case, the patch deliverable 330 can be made available and delivered to the client system via the network. In other cases, no network connection may be present. In such cases, the patch deliverable 330 may be provided to the client system 340 on a CD, DVD, or other machine-readable medium.

The software vendor system 305 can include a patch creation tool 310 that can be adapted to generate the patch deliverable 330 by reading information 320 identifying one or more target software packages for which a software patch is intended, reading a template 315 defining a format for the software patch deliverable 330, and generating the software patch deliverable 330 based on the template 315 and including the software patch 325 and the information 320 identifying the target software package(s). That is, based on a template 315 defining, for example a format, for the patch deliverable 330, the patch creation tool 310 can read a specified identifying information 320 for a particular patch 325 and package the patch 325 and identifying information 320 into a properly structured and/or formatted patch deliverable 330 for transmission or other delivery to the client system 340. An exemplary process for generating a patch deliverable as may be performed by the patch creation tool 310 is described below with reference to FIG. 4.

The patch deliverable 330 can include the software patch 336 and information 335 identifying a target software package(s) for which the patch 336 is intended or may be used. According to one embodiment, the information 335 identifying the target software package(s) can comprise a product name for the target software package(s). Additionally or alternatively, the information identifying the target software package(s) can comprise a version for the target software package(s). In some cases, the information identifying the target software package(s) can comprise metadata. For example, the information identifying the target software package(s) can comprise an eXtensible Markup Language (XML) file including the metadata.

The client system 340 can be adapted to receive the patch deliverable 330 from the software vendor system 330. For example, the client system 340 can include a patch installation tool 345 that can read the information 335 identifying the target software package(s) from the patch deliverable 330. The client system 340 can also include a number of software packages 350, 360, and 370. The patch installation tool 345 can be adapted to determine whether the information 335 identifying the target software package(s) indicates a known software package by comparing the information 335 identifying the target software package(s) to seed information 351 and 361 identifying the software packages 350, 360, and 370 on the client system 340. The seed information 351 and 361 can identify one or more of the software packages 350 and 360 on the client system 340 and can comprise information previously stored in a predetermined location known to the patch installation tool 345, for example, within the software package 350 and 360. However, as will be seen, some of the software packages 370 may not have seed information stored. Thus, such a package may not yet be "known" to or identifiable by the patch installation tool 345.

After reading the information 335 identifying the target software package(s) from the patch deliverable 330, the patch installation tool can make a determination as to whether the information 335 identifying the target software package(s) indicates a known software package. Determining whether the information identifying the target software package indicates a known software package can comprise comparing the information 335 identifying the target software package to seed information 351 and 361 that may be stored, for example, in the software package itself at a location known to the patch installation tool 345 and can identify the software package(s) 350 and 360.

In response to determining the information 335 identifying the software package for which the patch 336 is intended indicates a known software package, the patch installation tool 345 can install the patch 336 for the indicated software product. In response to determining the information 335 identifying the software package for which the patch 336 is intended does not indicate a known software package, the patch installation tool 345 can present options identifying at least one software package to a user of the client system. For example, the options may include a list of graphical or textual representation of all the software packages 350, 360, and 370 on the client system and an indication of the identifying information 335 from the patch deliverable 330. The user can then select or indicate the correct software package for the patch 336. That is, the information identifying a software package for which the patch may be used can, in some cases, identify more than one software package. In such cases, the software packages thus identified can be presented as options to the user for selection or confirmation of the software package for which the patch should be used.

The selection of one of the at least one software package represented by the options presented can be received by the patch installation tool 345 from the user. The selected software package can be seeded with the information identifying the target software package and the patch 336 can be installed for the selected software product. Seeding the selected software package with the information identifying the target software package can comprise storing the information identifying the target software package in a predetermined location. That is, once the identifying information from the patch deliverable has been identified by the user as corresponding to a particular software package, that package can be seeded with the identifying information so that subsequent patch deliverables with the same identifying information can be correlated to that particular software package. An exemplary process for installing a patch as may be performed by the patch installation tool 345 will be described below with reference to FIG. 5.

Figure 4:
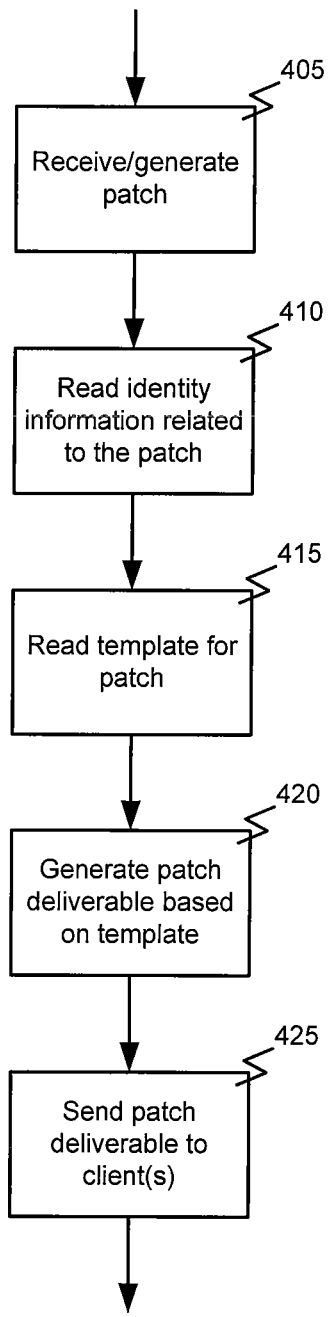
FIG. 4 is a flowchart illustrating a process for preparing and delivering a software patch according to one embodiment of the present invention.

FIG. 4 is a flowchart illustrating a process for preparing and delivering a software patch according to one embodiment of the present invention. In this example, the process begins with receiving 405 or generating the patch. Information identifying one or more target software packages for which a software patch is intended can be read 410. A template defining a format for the software patch deliverable can also be read 415. The software patch deliverable can be generated 420 based on the template and can include the software patch and the information identifying the target software package. For example, the information identifying the target software package can comprise a product name for the target software package and/or a version for the target software package. According to one embodiment, the information identifying the target software package can comprise metadata. For example, the information identifying the target software package can comprise an eXtensible Markup Language (XML) file including the metadata. The software patch deliverable can be provided 425 to one or more client systems in which the target software package may be installed. For example, the deliverable can be made available via a website or web service, can be burned onto a CD or DVD and shipped, etc.

Figure 5:
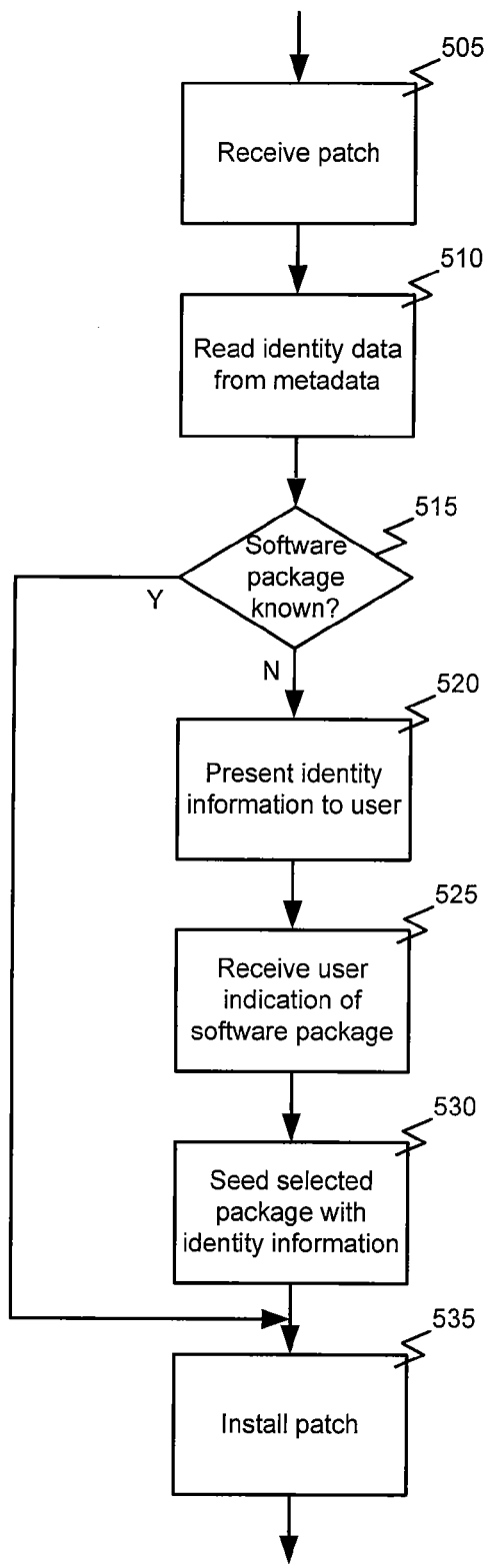
FIG. 5 is a flowchart illustrating a process for patching a software product according to one embodiment of the present invention.

FIG. 5 is a flowchart illustrating a process for patching a software product according to one embodiment of the present invention. In this example, the process begins with receiving 505 a patch deliverable, e.g., a file. The patch deliverable can include a software patch and information identifying one or more target software packages for which the patch is intended or may be used. The information identifying the target software package can be read 510 from the patch deliverable. A determination 515 can be made as to whether the information identifying the target software package indicates a known software package. According to one embodiment, determining 515 whether the information identifying the target software package indicates a known software package can comprise comparing the information identifying the target software package to seed information identifying each of at least one software package. For example, the seed information identifying each of at least one software package can comprise information previously stored in a predetermined location in the software package to which it relates.

In response to determining 515 the information identifying the software package for which the patch is intended indicates a known software package, the patch can be installed 535 for the known software product. In response to determining 515 the information identifying the software package for which the patch is intended does not indicate a known software package options identifying at least one software package for which the patch may be used can be presented 520 to a user and a selection of one of the at least one software package can be received 525 from the user. The selected software package can be seeded 530 with the information identifying the target software package and the patch can be installed 535 for the selected software product. Seeding 535 the selected software package with the information identifying the target software package can comprise storing the information identifying the target software package in a predetermined location for example, in the target software package.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of patching software based on seeded product information, the method comprising:

receiving, at a client system from a software vendor system, a patch deliverable, the patch deliverable including a software patch and information identifying each of a plurality of target software packages for which the software patch is intended, wherein the target software packages of the plurality of target software packages comprises a plurality of different applications;

reading by the client system the information identifying the target software packages from the patch deliverable;

determining by the client system whether the identified target software packages is a known software package of the client, wherein determining whether the identified target software packages indicates a known software package of the client comprises comparing the information identifying the target software packages from the patch deliverable to seed information stored in the software package that is accessible to the client system and if there is a match from the comparison then the software package is a known target software package to the client system, otherwise the software package is an unknown target software package to the client system;

in response to determining the information identifying the target software packages for which the patch is intended is at least one known software package of the client system, installing at the client system the patch for at least one known software product; and in response to determining the information identifying the target software packages for which the patch is intended is at least one unknown software package, identifying by the client system all unknown software packages and installing at the client system the patch for at least one unknown software product of an unknown software package;

wherein identifying by the client system all unknown software package comprises:

presenting, by the client system to a user, options identifying at least one software package for which the patch may be used;

receiving, at the client system from the user, a selection of one of the software packages;

seeding, by the client system, the selected software package with embedded software patch information from the patch deliverable, wherein the selected software package will be known to the system as the corresponding software package for this software patch in future invocations.

2. The method of claim 1, wherein the seed information identifying each of at least one software package comprises information previously stored in a predetermined location.

3. The method of claim 1, wherein seeding the selected software package with the information identifying the target software package comprises storing the information identifying the target software package in a predetermined location on the client system.

4. The method of claim 1, wherein the information identifying the target software package comprises a product name for the target software package.

5. The method of claim 4, wherein the information identifying the target software package comprises a version for the target software package.

6. The method of claim 1, wherein the information identifying the target software package comprises metadata.

7. The method of claim 6, wherein the information identifying the target software package comprises an eXtensible Markup Language (XML) file including the metadata.

8. A non-transitory machine-readable memory having stored thereon a series of instructions which, when executed by a processor, cause the processor to patch software based on seeded product information by:

receiving at a client system from a software vendor system a patch deliverable, the patch deliverable including a software patch and information identifying each of a plurality of target software packages for which the software patch is intended, wherein the target software packages of the plurality of target software packages comprise a plurality of different applications;

reading by the client system the information identifying the target software packages from the patch deliverable;

determining by the client system whether the identified target software packages is a known software package of the client, wherein determining whether the identified target software packages indicates a known software package of the client comprises comparing the information identifying the target software packages from the patch deliverable to seed information stored in the software package that is accessible to the client system and if there is a match from the comparison then then software package is a known target software package to the client system, otherwise the software package is an unknown target software package to the client system;

in response to determining the information identifying the target software packages for which the patch is intended is at least one known software package of the client system, installing at the client system the patch for the at least one known software product; and in response to determining the information identifying the target software packages for which the patch is intended is at least one unknown software package, identifying by the client system all unknown software packages and installing at the client system the patch for at least one unknown software product of an unknown software package;

wherein identifying by the client system all unknown software package comprises:

presenting, by the client system to a user, options identifying at least one software package for which the patch may be used;

receiving, at the client system from the user, a selection of one of the software packages;

seeding, by the client system, the selected software package with embedded software patch information from the patch deliverable, wherein the selected software package will be known to the system as the corresponding software package for this software patch in future invocations.

9. The machine-readable memory of claim 8, wherein the seed information identifying each of at least one software package comprises information previously stored in a predetermined location.

10. The machine-readable memory of claim 8, wherein seeding the selected software package with the information identifying the target software package comprises storing the information identifying the target software package in a predetermined location on the client system.

11. A system comprising:
a software vendor system adapted to generate a patch deliverable wherein the patch deliverable includes a software patch and information identifying each of a plurality of target software packages for which the software patch is intended, wherein the target software packages of the plurality of target software packages comprise a plurality of different applications; and
a client system adapted to obtain the patch deliverable from the software vendor system, read the information identifying the target software packages from the patch deliverable, determine whether the identified target software packages is a known software package on the client system, wherein determining whether the identified target software packages indicates a known software package comprises comparing the information identifying the target software packages from the patch deliverable to seed information stored in the software package that is accessible to the client system and if there is a match from the comparison then the software package is a known target software package to the client system, otherwise the software package is an unknown target software package to the client system, in response to determining the information identifying the target software packages for which the patch is intended is at least one known software package of the client system, installing the patch for the at least one known software product, and in response to determining the information identifying the target software packages for which the patch is intended is at least one unknown software package, identifying by the client system all unknown software packages and installing at the client system the patch for at least one unknown software product of an unknown software package;
wherein identifying by the client system all unknown software packages comprises;
presenting, by the client system to a user, options identifying at least one software package for which the patch may be used;
receiving, at the client system from the user, a selection of one or the software packages;
seeding, by the client system, the selected software package with embedded software patch information from the patch deliverable, wherein the selected software package will be known to the system as the corresponding software package for this software patch in future invocations.

12. The system of claim 11, wherein the seed information identifying each of at least one software package on the client system comprises information previously stored in a predetermined location.

13. The system of claim 11, wherein the client system seeds the selected software package with the information identifying the target software package by storing the information identifying the target software package in a predetermined location.

14. The system of claim 11, wherein the information identifying the target software package comprises a product name for the target software package.

15. The system of claim 14, wherein the information identifying the target software package comprises a version for the target software package.

16. The system of claim 11, wherein the information identifying the target software package comprises metadata.

17. The system of claim 16, wherein the information identifying the target software package comprises an eXtensible Markup Language (XML) file including the metadata.

18. The system of claim 11 wherein the software vendor system is adapted to generate the patch deliverable by reading information identifying a target software package for which a software patch is intended, reading a template defining a format for the software patch deliverable, and generating the software patch deliverable based on the template and including the software patch and the information identifying the target software package.

* * * * *

UNITED STATES PATENT AND TRADEMARK OFFICE
CERTIFICATE OF CORRECTION

| | |
|---|---|
| PATENT NO. | : 8,615,751 B2 |
| APPLICATION NO. | : 11/680383 |
| DATED | : December 24, 2013 |
| INVENTOR(S) | : Ganesan et al. |

It is certified that error appears in the above-identified patent and that said Letters Patent is hereby corrected as shown below:

In the Claims:

In column 12, line 39, in Claim 8, delete "then then" and insert -- then --, therefor.

Signed and Sealed this
Second Day of September, 2014

Michelle K. Lee
*Deputy Director of the United States Patent and Trademark Office*